(12) United States Patent
Cocchi et al.

(10) Patent No.: US 10,617,130 B2
(45) Date of Patent: *Apr. 14, 2020

(54) MACHINE AND METHOD FOR MAKING HOT OR COLD LIQUID AND SEMI-LIQUID PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L—CARPIGIANI, Cernuscosul (IT)

( * ) Notice: Subject to any disclaimer, the term of this patent is extended or adjusted under 35 U.S.C. 154(b) by 164 days.

This patent is subject to a terminal disclaimer.

(21) Appl. No.: 15/285,876

(22) Filed: Oct. 5, 2016

(65) Prior Publication Data
US 2017/0099855 A1 Apr. 13, 2017

(30) Foreign Application Priority Data
Oct. 7, 2015 (IT) .................. 102015000059302

(51) Int. Cl.
*A23G 9/16* (2006.01)
*A23G 9/12* (2006.01)
(Continued)

(52) U.S. Cl.
CPC .............. *A23G 9/16* (2013.01); *A23G 9/12* (2013.01); *A23G 9/166* (2013.01); *A23G 9/28* (2013.01);
(Continued)

(58) Field of Classification Search
CPC .......... A23G 9/045; A23G 9/08–9/281; A23G 9/166; A23F 5/08; A23F 5/24;
(Continued)

(56) References Cited

U.S. PATENT DOCUMENTS 3,158,485 A * 11/1964 De Santa Luce ......... A23F 5/44
426/596
3,327,615 A * 6/1967 Swan .................... A47J 31/408
99/282
(Continued)

FOREIGN PATENT DOCUMENTS

| CN | 1289549 C | 4/2001 |
| CN | 1813558 A | 8/2006 |

(Continued)

OTHER PUBLICATIONS

Coffee Ice Cream NPL, https://noteatingoutinny.com/2007/04/14/fresh-coffee-premium-ice-cream/, p. 1-2. (Year: 2007).*

(Continued)

*Primary Examiner* — Drew E Becker
(74) *Attorney, Agent, or Firm* — Shuttleworth & Ingersoll, PLC; Timothy J. Klima

(57) ABSTRACT

A machine for making liquid and/or semi-liquid food products includes a boiler for heating; a first chamber for processing a hot type liquid product, having an outlet and an inlet connected to the boiler; and a first dispensing unit, connectable to the outlet for dispensing a hot product. A mixing and cooling unit for making a cold type product includes a processing container and a stirrer, the mixing and cooling unit being connectable to the outlet for receiving the hot product defining a basic ingredient for making a product of the cold type. The outlet is switchable between a first configuration wherein the outlet is operatively connected to the mixing and cooling unit to allow transfer of hot product inside the processing container, and a second configuration wherein the outlet is operatively connected to the first dispensing unit to allow hot product to be dispensed.

10 Claims, 3 Drawing Sheets

(51) Int. Cl.
*A23G 9/28* (2006.01)
*A47J 31/34* (2006.01)
*A47J 31/40* (2006.01)
*A47J 31/24* (2006.01)

(52) U.S. Cl.
CPC .............. *A23G 9/281* (2013.01); *A47J 31/34* (2013.01); *A47J 31/40* (2013.01); *A47J 31/24* (2013.01)

(58) Field of Classification Search
CPC ... A47J 31/0668–31/0678; A47J 31/40–31/41; A47J 31/42; A47J 31/46–31/469; A47J 42/00; A47J 31/24; A47J 31/34
See application file for complete search history.

(56) References Cited

U.S. PATENT DOCUMENTS

| | | | |
|---|---|---|---|
| 3,474,821 A | 10/1969 | Fuller | |
| 3,492,126 A * | 1/1970 | Rubenstein | A23F 3/163 |
| | | | 426/565 |
| 3,517,524 A * | 6/1970 | Fiedler | A23G 9/045 |
| | | | 222/129.1 |
| 3,803,870 A | 4/1974 | Conz | |
| 3,969,531 A | 7/1976 | Cornelius | |
| 4,169,359 A | 10/1979 | Weerstra | |
| 4,201,558 A | 5/1980 | Schwitters et al. | |
| 4,659,575 A | 4/1987 | Fiedler | |
| 5,235,902 A * | 8/1993 | Ogawa | A47J 31/002 |
| | | | 222/129 |
| 5,269,146 A | 12/1993 | Kerner | |
| 5,312,020 A * | 5/1994 | Frei | G07F 13/065 |
| | | | 222/129.1 |
| 5,713,214 A | 2/1998 | Ugolini | |
| 5,724,883 A * | 3/1998 | Usherovich | A47J 31/057 |
| | | | 426/433 |
| 5,967,226 A | 10/1999 | Choi | |
| 6,058,721 A | 5/2000 | Midden et al. | |
| 6,182,862 B1 | 2/2001 | McGill | |
| 6,438,987 B1 * | 8/2002 | Pahl | A23G 9/045 |
| | | | 62/342 |
| 8,651,011 B2 * | 2/2014 | Sinzig | A47J 31/3609 |
| | | | 99/287 |
| 9,968,113 B2 | 5/2018 | Lazzarini et al. | |
| 2001/0028913 A1 | 10/2001 | Kolar et al. | |
| 2002/0043071 A1 | 4/2002 | Frank et al. | |
| 2002/0048626 A1 | 4/2002 | Miller et al. | |
| 2004/0003620 A1 | 1/2004 | Cocchi et al. | |
| 2005/0103024 A1 * | 5/2005 | Rugeris | A23F 3/163 |
| | | | 62/1 |
| 2005/0178793 A1 * | 8/2005 | Cheng | B67D 1/1286 |
| | | | 222/1 |
| 2006/0169147 A1 | 8/2006 | Cocchi et al. | |
| 2006/0201329 A1 | 9/2006 | Lynch | |
| 2007/0051248 A1 * | 3/2007 | Lee | A23G 9/045 |
| | | | 99/281 |
| 2007/0110872 A1 | 5/2007 | Gerber | |
| 2009/0136639 A1 * | 5/2009 | Doglioni Majer | A47J 31/36 |
| | | | 426/431 |
| 2009/0323462 A1 | 12/2009 | Cocchi et al. | |
| 2010/0034950 A1 * | 2/2010 | Jones | A23F 5/24 |
| | | | 426/595 |
| 2010/0122539 A1 | 5/2010 | Cocchi et al. | |
| 2010/0199846 A1 | 8/2010 | Aus Der Fuenten | A47J 31/44 |
| | | | 99/279 |
| 2010/0229728 A1 * | 9/2010 | Kiefer | A47J 31/36 |
| | | | 99/280 |
| 2010/0242497 A1 * | 9/2010 | Bertone | A23G 9/045 |
| | | | 62/1 |
| 2010/0263544 A1 * | 10/2010 | Kodden | A47J 31/44 |
| | | | 99/288 |
| 2010/0266740 A1 * | 10/2010 | Van Den Aker | A23G 9/045 |
| | | | 426/433 |
| 2011/0014339 A1 * | 1/2011 | Stahl | F25D 31/005 |
| | | | 99/290 |
| 2011/0045152 A1 * | 2/2011 | Stutz | A47J 31/002 |
| | | | 426/433 |
| 2011/0310695 A1 | 12/2011 | Sus et al. | |
| 2012/0074176 A1 | 3/2012 | Sullivan et al. | |
| 2012/0199608 A1 | 8/2012 | Cocchi et al. | |
| 2012/0217264 A1 | 8/2012 | Cocchi et al. | |
| 2013/0000338 A1 | 1/2013 | Cocchi et al. | |
| 2013/0152797 A1 | 6/2013 | Mori | |
| 2013/0263747 A1 | 10/2013 | Ugolini | |
| 2013/0287914 A1 | 10/2013 | Fragniere | |
| 2014/0026761 A1 | 1/2014 | Bartoli et al. | |
| 2014/0134299 A1 | 5/2014 | Guidorzi et al. | |
| 2014/0212559 A1 | 7/2014 | Cocchi et al. | |
| 2014/0335232 A1 * | 11/2014 | Beth Halachmi | A23G 9/00 |
| | | | 426/87 |
| 2014/0345652 A1 | 11/2014 | Meng | |
| 2015/0141313 A1 | 5/2015 | Aregger et al. | |
| 2015/0150412 A1 | 6/2015 | Heitele | |
| 2015/0272382 A1 * | 10/2015 | Truninger | A47J 31/56 |
| | | | 99/286 |
| 2015/0289539 A1 * | 10/2015 | Noth | B01F 7/00458 |
| | | | 222/1 |
| 2015/0320078 A1 | 11/2015 | Cocchi | |
| 2015/0329282 A1 | 11/2015 | Bartoli et al. | |
| 2015/0329343 A1 * | 11/2015 | Kleinrchert | B67D 1/0406 |
| | | | 426/594 |
| 2016/0007626 A1 * | 1/2016 | Choi | A47J 31/002 |
| | | | 426/433 |
| 2016/0052706 A1 | 2/2016 | Talon et al. | |
| 2016/0214787 A1 | 7/2016 | Iotti | |
| 2016/0242594 A1 | 8/2016 | Empl et al. | |
| 2016/0249761 A1 * | 9/2016 | Llopis | A47J 31/38 |
| | | | 99/282 |
| 2016/0302443 A1 | 10/2016 | Lazzarini et al. | |
| 2016/0316781 A1 * | 11/2016 | Zappoli | A23G 9/28 |
| 2017/0042181 A1 * | 2/2017 | Fiaschi | A23F 3/40 |
| 2017/0112165 A1 | 4/2017 | Cocchi et al. | |
| 2017/0135520 A1 * | 5/2017 | Sato | A23F 5/26 |
| 2017/0150844 A1 | 6/2017 | Hesselbrock et al. | |
| 2017/0215456 A1 | 8/2017 | Noth et al. | |
| 2017/0290354 A1 * | 10/2017 | Pabst | A23F 5/26 |
| 2018/0098556 A1 | 4/2018 | Cocchi et al. | |
| 2018/0303122 A1 | 10/2018 | Cocchi et al. | |
| 2018/0305115 A1 | 10/2018 | Bartoli et al. | |

FOREIGN PATENT DOCUMENTS

| | | |
|---|---|---|
| CN | 101617733 A | 1/2010 |
| CN | 103228152 A | 7/2013 |
| CN | 103796562 A | 5/2014 |
| CN | 103857617 A | 6/2014 |
| EP | 0285709 A1 | 10/1988 |
| EP | 2401945 A1 | 1/2012 |
| EP | 2478803 A1 | 7/2012 |
| EP | 2491792 A1 | 8/2012 |
| EP | 3058831 A1 | 8/2016 |
| EP | 3081093 A1 | 10/2016 |
| EP | 3127431 A1 | 2/2017 |
| EP | 3158872 A1 | 4/2017 |
| GB | 1362752 A | 8/1974 |
| WO | 2011042489 A1 | 4/2011 |
| WO | WO2012036635 A1 | 3/2012 |
| WO | 2012104760 A1 | 8/2012 |
| WO | 2012160532 A1 | 11/2012 |
| WO | 2013019963 A2 | 2/2013 |
| WO | WO-2013041581 A1 * | 3/2013 ............ A47J 31/40 |
| WO | 2013188246 A2 | 12/2013 |
| WO | 2014029803 A1 | 2/2014 |
| WO | WO2015022678 A1 | 2/2015 |
| WO | 2015056188 A1 | 4/2015 |
| WO | WO2015092637 A1 | 6/2015 |
| WO | WO2015104610 A1 | 7/2015 |
| WO | 2015170174 A1 | 11/2015 |
| WO | 2016005112 A1 | 1/2016 |

(56) References Cited

FOREIGN PATENT DOCUMENTS

OTHER PUBLICATIONS

Italian Search Report dated Apr. 19, 2016 from counterpart Italian App No. UB20154199.
Italian Search Report dated Oct. 24, 2017 from related Italian App No. 201700043975.
Italian Search Report dated Sep. 14, 2015 for related Italian application No. BO20150179.
European Exam Report dated Sep. 26, 2017 from related European App No. 16164965.2.
Italian Search Report dated Apr. 20, 2016 for related Italian Application No. IT UB20155038.
Italian Search Report dated Jun. 8, 2017 from related Italian App No. IT 201600100869.
Italian Search Report dated Apr. 20, 2017 from related Italian App No. IT 201600074471.
European Search Report dated Nov. 7, 2017 for related European Patent Application No. 17181161.5.
Cocchi—U.S. Appl. No. 15/947,397, filed Apr. 6, 2018.
Cocchi—U.S. Appl. No. 15/726,088, filed Oct. 5, 2017.
Cocchi—U.S. Appl. No. 15/883,775, filed Jan. 30, 2018.
Cocchi—U.S. Pat. No. 10,172,373 granted Jan. 8, 2019.
Lazzarini—U.S. Pat. No. 9,968,113 granted May 15, 2018.
Chinese Office Action dated Nov. 21, 2019 for counterpart Chinese Patent Application No. 201611048851.9.

\* cited by examiner

MACHINE AND METHOD FOR MAKING HOT OR COLD LIQUID AND SEMI-LIQUID PRODUCTS

This application claims priority to Italian Patent Application 102015000059302 filed Oct. 7, 2015, the entirety of which is incorporated by reference herein.

BACKGROUND OF THE INVENTION

This invention relates to a machine and a method for making liquid and/or semi-liquid products such as hot beverages and ice cream based on a hot beverage.

Shops in this trade normally have machines for making hot beverages (by extraction/infusion) such as, for example, coffee, cappuccino, etc. and machines for making cold products (ice cream).

It should therefore be noted that in order to be able to offer their customers both hot beverages (obtained by extraction/infusion) and ice cream products, the shopkeepers need several different machines, which occupy a large amount of floor space and which periodically require maintenance and cleaning.

Thus, a need which is felt particularly strongly by operators in the trade is that of having a machine for making liquid and semi-liquid products and which is capable of making both hot beverages and liquid and/or semi-liquid ice cream products.

SUMMARY OF THE INVENTION

The aim of this invention, therefore, is to meet the above mentioned need by providing a machine for making liquid and semi-liquid products and which allows making both hot beverages and liquid and/or semi-liquid ice cream products.

A further aim of the invention is to provide a machine for making liquid and semi-liquid products, which allows making both hot beverages and liquid and/or semi-liquid ice cream products and which is particularly easy to use.

A yet further aim of the invention is to provide a machine for making liquid and semi-liquid products, which allows making both hot beverages and liquid and/or semi-liquid ice cream products and which is particularly easy to clean and maintain.

According to the invention, this aim is achieved by a machine and a method forming the object of the invention, for making liquid or semi-liquid products both of the hot beverage and ice cream type and comprising the technical features set out in one or more of the appended claims.

The above mentioned aims are achieved by a machine for making liquid and/or semi-liquid food products of the hot and cold type, comprising:

a first chamber for processing a liquid product of the hot type configured to receive a first basic heated liquid product and configured to house a second basic product in powder form to allow a contact between the first basic heated liquid product and the second basic product in powder form;

a dispensing unit connectable to the outlet of the first processing chamber for dispensing the hot product;

a mixing and cooling unit for making a cold type product, comprising a processing container and a stirrer mounted rotatably inside the container, the mixing and cooling unit being connectable to the outlet of the first processing chamber for receiving the hot product defining a basic ingredient for making a liquid or semi-liquid product of the cold type;

a thermal cooling system, associated with the mixing and cooling unit.

The above mentioned aims are also achieved by a method for making a food product of the hot beverage type or, alternatively, of the ice cream, type, comprising the following steps:

preparing a first processing chamber;

introducing a basic product in powder form or in the form of pieces of leaves into the first processing chamber;

introducing water or a water-based mixture at a temperature greater than 70° C. into the first processing chamber for making in the first processing chamber, by extraction or infusion, a product of the hot beverage type;

extracting the product of the hot beverage type from the first processing chamber;

dispensing the product of the hot beverage type or, alternatively performing the following steps:

placing the product of the hot beverage type inside a processing container of a mixing and cooling unit;

adding in the processing container further basic products for an ice cream product;

subjecting to simultaneous stirring and cooling at a temperature of less than 0° C., in the processing container, the product of the hot beverage type together with the further basic products, until making an ice cream type product;

extracting the product of the ice cream type from the processing container.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

DESCRIPTION OF THE PREFERRED EMBODIMENTS

Figure 1:
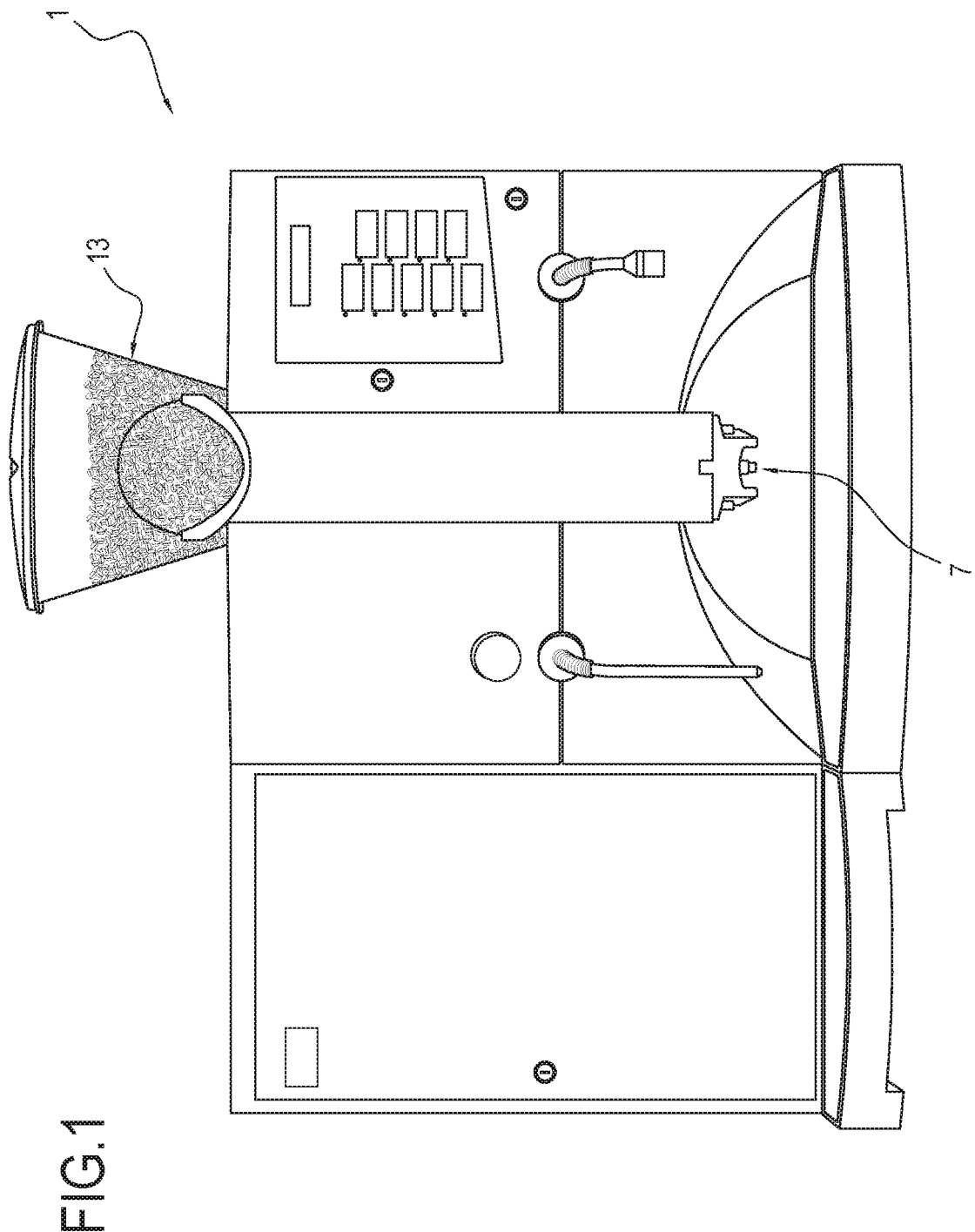
FIG. 1 is a schematic view of a machine of this invention for making hot or cold products.

With reference to the accompanying drawings, the numeral 1 denotes a machine for making hot or cold liquid and/or semi-liquid products according to this invention.

It should be noted that this machine is preferably also an ice cream machine, that is to say, it allows making ice cream.

In a preferred embodiment, the machine 1 for making liquid and/or semi-liquid food products of the hot and cold (ice cream) type comprises:

a boiler 2 for heating a first basic liquid product;

a first chamber 3 for processing a liquid product of the hot type, having at least one inlet 4 and one outlet 5, the inlet being connected to the heating boiler 2 for receiving therefrom the first basic heated liquid product and being adapted to house a second basic product in powder form (the first chamber 3 allows contact between the first basic heated liquid product and the second basic product in powder form);

means 6 for transferring the first basic liquid product from the heating boiler 2 to the first processing chamber 3;

a first dispensing unit 7, connectable to the outlet of the first processing chamber 3 for dispensing a hot product;

a mixing and cooling unit 8 for making a cold type product (ice cream), comprising a processing container 9 and a stirrer 10 mounted rotatably inside the container 9, the mixing and cooling unit 8 being connectable to the outlet of the first processing chamber 3 for receiving the hot product defining a basic ingredient for making a liquid or semi-liquid product of the cold type, a thermal cooling system, associated with the mixing and cooling unit 8, means 11 for switching the outlet of the first processing chamber 3, switchable between a first configuration where the outlet 5 of the first processing chamber 3 is operatively connected to the mixing and cooling unit 8, to allow hot product to be transferred into the processing container 9 of the mixing and cooling unit 8, and a second configuration where the outlet 5 of the first processing chamber 3 is operatively connected to the first dispensing unit 7 to allow hot product to be dispensed.

Described in more detail below are some aspects of the above mentioned features of the machine 1.

The thermal cooling system, associated with the mixing and cooling unit 8 preferably comprises a heat exchanger associated with the container 9 of the mixing and cooling unit 8.

Preferably, the thermal cooling system comprises a compressor.

Preferably, the thermal cooling system operates according to a thermodynamic cycle by exchanging heat through a heat exchanger fluid.

Figure 2:
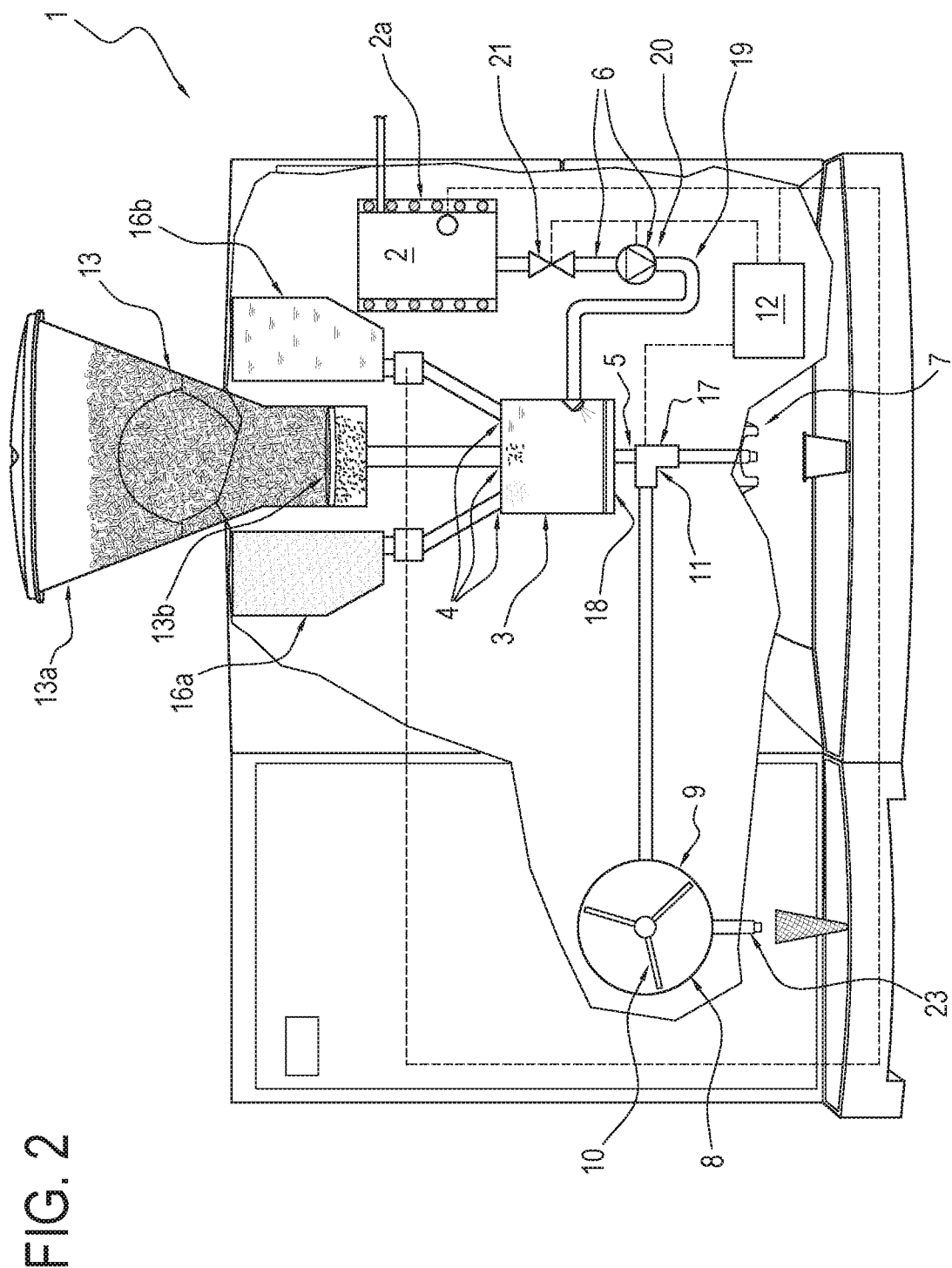
FIG. 2 is a schematic view of a first embodiment of a machine of this invention for making hot or cold products.
Figure 3:
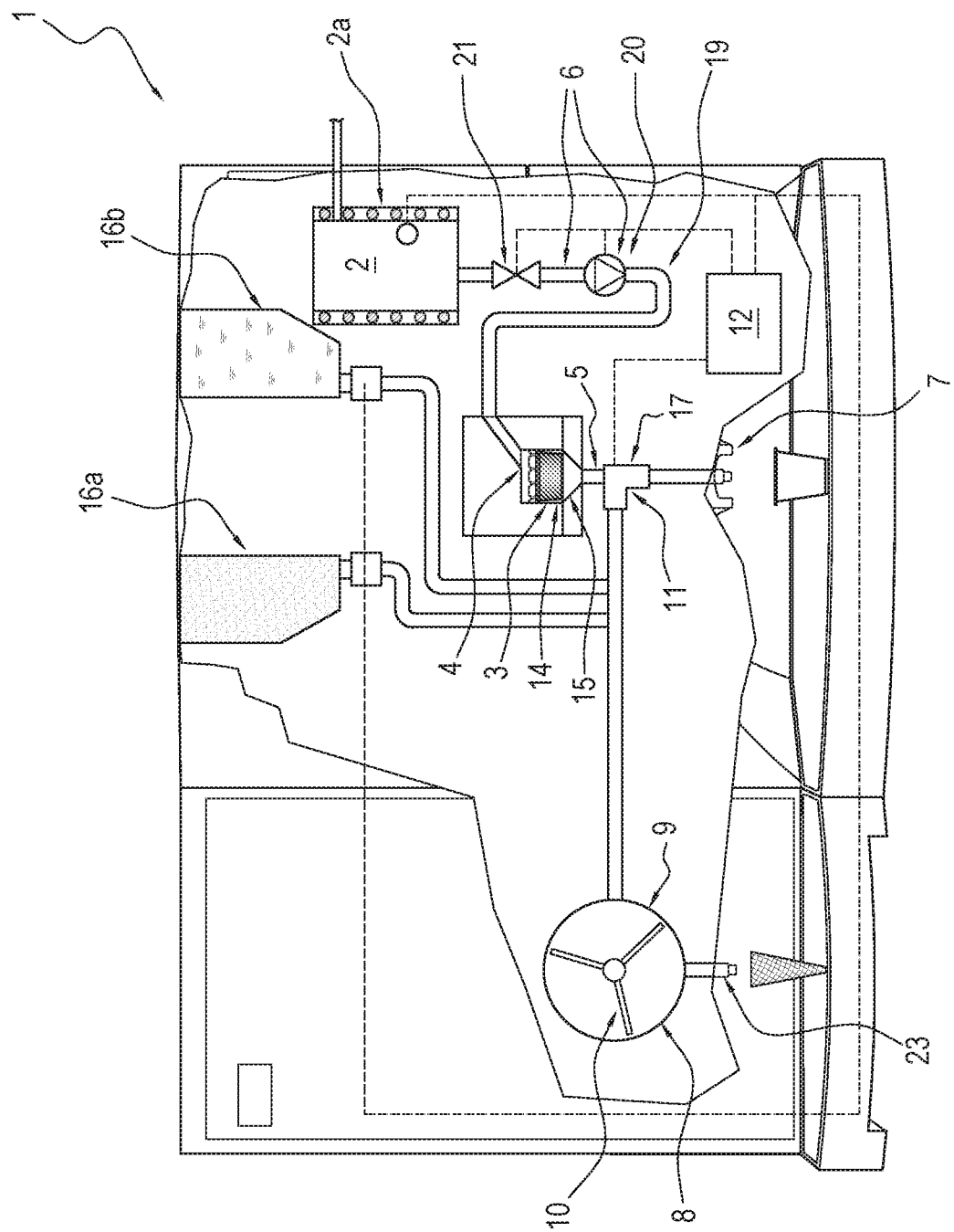
FIG. 3 is a schematic view of a second embodiment of a machine of this invention for making hot or cold products.

The heating boiler 2 comprises a container for containing water or a water mixture (illustrated in FIGS. 2 and 3).

The heating boiler 2 also preferably comprises a heater 2a (preferably electrical).

Further, the container of the boiler 2 is connected/connectable to the water mains to allow the level of the liquid inside it to be topped up.

According to another aspect, the container of the boiler 2 is connected to the first processing chamber 3 by means of a pipe 19.

It should be noted that the pipe 19 accommodates a transfer pump 20.

The transfer pump 20 and the pipe 19 define the means 6 for transferring the first basic liquid product from the heating boiler 2 to the first processing chamber 3.

It should be noted that the machine preferably comprises a shutoff valve 21 operatively associated with the pipe 19 and switchable between an open configuration where it allows the liquid to flow through and a closed configuration where it prevents the liquid from flowing through.

The transfer pump 20 is designed to increase the pressure of the first basic liquid product (water or water-based mixture) in such a way that it reaches the first processing chamber 3 at a predetermined pressure.

Preferably, the predetermined pressure is greater than 500 KPa; still more preferably it is greater than 800 KPa.

According to another aspect, the machine 1 comprises a drive and control unit 12 provided with controls for the operator and configured to allow, after selection of the commands, the controlling of the switching means 11 for regulating the configuration of the switching means 11, so as to allow dispensing a hot product through the first dispensing unit 7 or processing a product of the cold type in the mixing and cooling unit 8.

It should be noted that the switching means 11 preferably comprise a valve (still more preferably, a three-way valve, the inlet branch of which is connected to the chamber 3 and the two outlets of which are adapted to be placed selectively and respectively in communication with the mixing and cooling unit 8 and with the first dispensing unit 7).

The drive and control unit 12 performs one or more of the following operations: it activates the pump 20, regulates the valves (21, 17), the refrigerating system (not illustrated because it is of substantially known type), the stirrer 10, the heater of the boiler 2, the delivery of the ingredients from the containers (16a, 16b).

It should be noted that the user can, advantageously, use the same machine 1 to prepare a hot product or a cold product (ice cream) having the flavor of the hot beverage prepared previously.

Thus, the shopkeeper can advantageously prepare two or more types of product, both hot and cold, using a single machine 1.

Advantageously, the fact that a single machine 1 can be used to prepare two or more types of product, both hot and cold, makes it possible to reduce the shop floor space occupied and the time necessary to clean and maintain the machine itself.

It should also be noted that the machine 1 thus defined is particularly innovative in that it is capable of making an ice cream type product from a hot beverage, that is to say, an ice cream having the flavor of the hot beverage: thus, as may easily be inferred, the machine 1 is capable of making a particularly innovative product having much appreciated organoleptic properties.

It should be noted that using such a machine allows greatly reducing overall production times by quickly making a cold, ice cream type product having the flavor of the hot beverage made by the same machine (coffee, cappuccino, tea or other beverages made by extraction or infusion).

According to another aspect, the first processing chamber 3 is preferably an extraction chamber for processing hot extraction beverages (coffee, cappuccino, etc.).

According to another aspect (embodiment of FIG. 3), the machine 1 comprises a chamber 13 for grinding products in grains, formed by a reservoir 13a for containing product in grains and a grinder 13b for grinding the product in grains and transforming it into powder, and which is connected to the first processing chamber 3 to deliver the product ground into powder to the first processing chamber 3.

Thanks to the grinding chamber 13, the basic product used to obtain the hot beverage (by extraction or infusion) can be stored in the machine directly in grain form and ground at time of use: thus, the organoleptic quality of the end product obtained is improved.

In the embodiment illustrated in FIG. 2, the machine 1 comprises a unit 14 for loading capsules or pods, having a seat 15 for housing at least one capsule or pod, and configured to allow the loading of the capsule or pod inside the first processing chamber 3.

According to this embodiment, the hot beverage is made from a base preparation (ingredients) placed in a capsule or pod which is loaded for use in the machine by means of the loading unit 14.

Preferably, the capsule or pod contains a powder.

It should be noted that in a first embodiment, the capsule or pod comprises filter material.

Further, according to another aspect, the machine 1 comprises a plurality of containers 16a, 16b for supplying further basic products (for the hot beverage and/or for the ice cream type product), which can be connected to the first processing chamber 3 and/or to the processing container 9 of the mixing and cooling unit 8.

The further basic products may comprise sugar or milk, for example.

According to yet another aspect, the means 11 for switching the outlet 5 of the first processing chamber 3 comprise at least one valve 17, which can be activated for switching the configuration between the above-mentioned first configuration and second configuration.

Preferably, the valve 17 is a three-way valve.

According to yet another aspect, the machine 1 comprises a filter 18 removably positioned in the first processing chamber 3, for filtering the product flowing out of the first processing chamber 3.

The machine 1 is also provided with a second dispenser 23, connected to the container 9 of the mixing and cooling unit 8 to deliver to the outside the ice cream made inside the container 9 of the mixing and cooling unit 8.

Below is a brief description of how the machine 1 is used and from which some further advantages of the invention may be inferred.

With the machine 1, the shopkeeper (user) is able to make a hot beverage type product or an ice cream type product such as gelato.

To make a hot beverage type product, the basic solute is first placed in the first processing chamber 3 (by means of a capsule or pod or by drawing it from the container 13a of the grinding chamber 13) and water previously heated (in the heating boiler 2) is delivered into the processing chamber 3.

The pump 20 is therefore activated to transfer water from the boiler 2 to the first processing chamber 3.

Depending on the type of product to be made (infusion or extraction), the water is kept for a predetermined length of time in the processing chamber 3 in order to make the hot beverage type product by extraction or infusion.

The outlet 5 of the mixing chamber is selectively connected to the first dispensing unit 7 or to the container 9 of the mixing and cooling unit 8, depending on the configuration of the switching means 11 (valve 17), that is, on the selection or program set by the user.

If the user requires a hot beverage to be dispensed, the outlet 5 of the mixing chamber is selectively connected to the first dispensing unit 7 so that the hot beverage is delivered through the dispensing unit 7 (to a serving container or cup below).

If, on the other hand, the product to be made is ice cream based on the hot beverage, the outlet 5 of the mixing chamber is selectively connected to the container 9 of the mixing and cooling unit 8.

That way, the hot beverage is transferred into the container 9 of the mixing and cooling unit 8.

Preferably, the container 9 of the mixing and cooling unit 8 is connected to the first processing chamber 3 by way of a pipe 22 through which the product is transferred from the first processing chamber 3 to the container 9 of the mixing and cooling unit 8.

At the same time, other ingredients needed to make a basic ice cream mixture (for example, milk and/or sugar) can be transferred into the container 9 of the mixing and cooling unit 8.

Preferably, these further ingredients are drawn from the containers 16a, 16b in the machine.

Next, the drive and control unit 12 activates the refrigeration system to cool the contents of the container 9 of the mixing and cooling unit 8—through the walls of the container 9—and at the same time, sets the stirrer 10 in rotation.

Cooling and simultaneously stirring the mixture with the stirrer 10 causes the mixture to incorporate air and to become ice cream with the flavor of the basic beverage used to start with (for example, if the hot beverage type product supplied to the container 9 is coffee, a coffee flavored ice cream is obtained).

The ice cream thus obtained is then dispensed through the second dispensing unit 23.

Thus, it is evident that two distinct products can be made: a hot beverage and an ice cream product with the flavor of the hot beverage made previously.

According to another aspect, also defined is a method for making a food product of the hot beverage type or, alternatively, of the ice cream type.

The method comprises the following steps:
preparing a first processing chamber 3;
introducing a basic product in powder form or in the form of pieces of leaves into the first processing chamber 3;
introducing water or a water-based mixture at a temperature greater than 70° C. into the first processing chamber 3 for making in the first processing chamber 3, by extraction or infusion, a product of the hot beverage type;
extracting the product of the hot beverage type from the first processing chamber 3;
dispensing the product of the hot beverage type or, alternatively performing the following steps:
placing the product of the hot beverage type inside a processing container 9 of a mixing and cooling unit 8;
adding in the processing container 9 further basic products for an ice cream product;
subjecting to simultaneous stirring and cooling at a temperature of less than 0° C., in the processing container 9, the product of the hot beverage type together with the further basic products, until making an ice cream type product (by gradually incorporating air into the processed product);
extracting the product of the ice cream type from the processing container 9.

Preferably, also defined is a method for making an ice cream type food product.

The method comprises the following steps:
preparing a first processing chamber 3;
introducing a basic product in powder form or in the form of pieces of leaves into the first processing chamber 3;
introducing water or a water-based mixture at a temperature greater than 70° C. into the first processing chamber 3 for making in the first processing chamber 3, by extraction or infusion, a product of the hot beverage type;
extracting the product of the hot beverage type from the first processing chamber 3;
placing the product of the hot beverage type inside a processing container 9 of a mixing and cooling unit 8;
adding in the processing container 9 further basic products for an ice cream product;
subjecting to simultaneous stirring and cooling at a temperature of less than 0° C., in the processing container 9, the product of the hot beverage type together with the further basic products, until making an ice cream type product (by gradually incorporating air into the processed product);
extracting the product of the ice cream type from the processing container 9.

It should be noted that this method advantageously allows making an ice cream type product from a hot beverage obtained by extraction or infusion.

Preferably, according to another aspect, the step of introducing water or a water-based mixture into the first processing chamber 3 comprises a step of introducing a predetermined quantity of water or a predetermined water-based mixture at a pressure of more than 500 kPa.

According to another aspect, the time the water or a water-based mixture remains in the first processing chamber 3 is less than 30 seconds.

According to yet another aspect, the step of subjecting the product of the hot beverage type to simultaneous stirring and cooling at a temperature of less than 0° C. together with the further basic products comprises cooling the product of the hot beverage type together with the further basic products at a temperature of between −5° and −15° C.

According to a further aspect, the method comprises a step of preparing a grinding chamber 13 and a step of introducing a basic product in powder form or in the form of pieces of leaves into the first processing chamber 3.

According to another aspect, the step of introducing a basic product in powder form or in the form of pieces of leaves into the first processing chamber 3 comprises a step of preparing a capsule or pod containing the basic product in powder form or in the form of pieces of leaves and a step of introducing the capsule or pod into the first processing chamber 3.

It should be noted that a new type of ice cream product, made from a hot beverage, is also defined according to the invention: the product is characterized by organoleptic properties not possessed by ice creams of known type.

The hot beverage gives the ice cream product a specific molecular structure which differs from that of ice creams of known type: in this sense, a product is defined which possesses distinctive organoleptic properties with special appeal for users.

What is claimed is:

1. A machine for making both a hot liquid food product and an ice cream product, comprising:
    a first processing chamber for processing the hot liquid food product configured to receive a first basic heated liquid product and configured to house a second basic product in powder form to allow a contact between the first basic heated liquid product and the second basic product in powder form, the first processing chamber including an outlet;
    a first dispensing unit, connectable to the outlet of the first processing chamber for dispensing the hot liquid food product;
    a mixing and cooling unit for making the ice cream product, comprising a processing container and a stirrer mounted rotatably inside the processing container, the mixing and cooling unit being connectable to the outlet of the first processing chamber for receiving the hot liquid food product defining a basic ingredient for making the ice cream product;
    a plurality of containers for supplying further basic products for the ice cream product, the plurality of containers being connectable to the processing container;
    a thermal cooling system operatively connected with the mixing and cooling unit for maintaining an interior of the processing container at a temperature between −5° and −15° C. for making the ice cream product;
    a switching device including a valve for switching the outlet between a first configuration wherein the outlet is operatively connected to the mixing and cooling unit to allow the hot liquid food product to be transferred into the processing container, and a second configuration wherein the outlet is operatively connected to the first dispensing unit to allow the first dispensing unit to deliver the hot liquid food product;
    a heating boiler for heating the first basic heated liquid product and wherein the first processing chamber includes an inlet connected to the heating boiler to receive the first basic heated liquid product;
    a connecting pipe connecting the heating boiler to the inlet;
    a pump positioned in the connecting pipe and adapted to increase a pressure of the first basic heated liquid product such that the first basic heated liquid product reaches the first processing chamber at a predetermined pressure;
    wherein the valve is a three-way valve including an inlet connected to the first processing chamber and two outlets which are adapted to be placed selectively in communication with the mixing and cooling unit and with the first dispensing unit;
    a drive and control unit including controls for an operator and suitable for allowing, after selection of commands by the operator, controlling of the three-way valve for regulating a configuration of the three-way valve;
    the drive and control unit suitable for performing all of the following:
        activating the pump;
        regulating the three-way valve, the stirrer, and the heating boiler.

2. The machine according to claim 1, wherein the first processing chamber is an extraction chamber for processing hot extraction beverages.

3. The machine according to claim 1, comprising a chamber for granular product, including a reservoir for containing the granular product and a grinder for grinding the granular product into powder, the chamber for granular product being connected to the first processing chamber to deliver the powder to the first processing chamber.

4. The machine according to claim 1, comprising a unit for loading a capsule or pod, having a seat for housing the capsule or pod, and configured to allow loading of the capsule or pod inside the first processing chamber.

5. The machine according to claim 1, comprising a filter removably positioned in the first processing chamber, for filtering product flowing out of the first processing chamber.

6. The machine according to claim 1, comprising a second dispenser, connected to the processing container of the mixing and cooling unit to deliver to an exterior the ice cream product made inside the processing container.

7. A method for making both a hot liquid food product and an ice cream product, comprising:
    providing:
        a first processing chamber for processing the hot liquid food product configured to receive a first basic heated liquid product and configured to house a second basic product in powder form or in a form of pieces of leaves to allow a contact between the first basic heated liquid product and the second basic product in powder form, the first processing chamber including an outlet;
        a first dispensing unit, connectable to the outlet of the first processing chamber for dispensing the hot liquid food product;
        a mixing and cooling unit for making the ice cream product, comprising a processing container and a stirrer mounted rotatably inside the processing container, the mixing and cooling unit being connectable to the outlet of the first processing chamber for receiving the hot liquid food product defining a basic ingredient for making the ice cream product,
        a thermal cooling system operatively connected with the mixing and cooling unit for maintaining an interior of the processing container at a temperature between −5° and −15° C. for making the ice cream product;
        a switching device including a valve for switching the outlet between a first configuration wherein the outlet is operatively connected to the mixing and cooling unit to allow the hot liquid food product to be transferred into the processing container, and a second configuration wherein the outlet is operatively connected to the first dispensing unit to allow the first dispensing unit to deliver the hot liquid food product;

a heating boiler for heating the first basic heated liquid product and wherein the first processing chamber includes an inlet connected to the heating boiler to receive the first basic heated liquid product;

a connecting pipe connecting the heating boiler to the inlet;

a pump positioned in the connecting pipe and adapted to increase a pressure of the first basic heated liquid product such that the first basic heated liquid product reaches the first processing chamber at a predetermined pressure;

preparing the first processing chamber;

wherein the valve is a three-way valve including an inlet connected to the first processing chamber and two outlets which are adapted to be placed selectively in communication with the mixing and cooling unit and with the first dispensing unit;

a drive and control unit including controls for an operator and suitable for allowing, after selection of commands by the operator, controlling of the three-way valve for regulating a configuration of the three-way valve;

the drive and control unit suitable for performing all of the following:

activating the pump;

regulating the three-way valve, the stirrer, and the heating boiler;

introducing the second basic product in powder form or in a form of pieces of leaves into the first processing chamber;

introducing water or a water-based mixture at a temperature greater than 70° C. into the first processing chamber for making in the first processing chamber, by extraction or infusion, the hot liquid food product;

extracting the hot liquid food product from the first processing chamber;

dispensing the hot liquid food product or, alternatively performing the following steps:

placing the hot liquid food product inside the processing container of the mixing and cooling unit;

adding in the processing container further basic products for the ice cream product;

subjecting to simultaneous stirring and cooling at a temperature of between −5° and −15° C., in the processing container, the hot liquid food product together with the further basic products, to make the ice cream product;

dispensing the ice cream product from the processing container.

8. The method according to claim 7, wherein the step of introducing water or a water-based mixture into the first processing chamber comprises a step of introducing a predetermined quantity of water or a predetermined water-based mixture at a pressure of more than 500 kPa.

9. The method according to claim 7, wherein a time the water or a water-based mixture remains in the first processing chamber is less than 30 seconds.

10. The method according to claim 7, comprising a step of preparing the powder in a grinding chamber and a step of introducing the powder into the first processing chamber.

\* \* \* \* \*